United States Patent
Batool Zaidi et al.

(10) Patent No.: US 12,360,654 B1
(45) Date of Patent: Jul. 15, 2025

(54) TECHNIQUES FOR TARGETED DATA EXTRACTION FROM UNSTRUCTURED SETS OF DOCUMENTS

(71) Applicant: Actfore, Reston, VA (US)

(72) Inventors: Syeda Yumna Batool Zaidi, Reston, VA (US); Peyman Shirazi Fard, Reston, VA (US); Dhiraj Sharma, Reston, VA (US); Sanskriti Shivhare, Washington, DC (US)

(73) Assignee: ACTFORE, Reston, VA (US)

(*) Notice: Subject to any disclaimer, the term of this patent is extended or adjusted under 35 U.S.C. 154(b) by 0 days.

(21) Appl. No.: 19/066,809

(22) Filed: Feb. 28, 2025

(51) Int. Cl.
| G06F 3/0483 | (2013.01) |
| G06F 3/0482 | (2013.01) |
| G06F 3/0486 | (2013.01) |
| G06V 10/25 | (2022.01) |
| G06V 30/10 | (2022.01) |

(52) U.S. Cl.
CPC .......... *G06F 3/0483* (2013.01); *G06F 3/0482* (2013.01); *G06F 3/0486* (2013.01); *G06V 10/25* (2022.01); *G06V 30/10* (2022.01)

(58) Field of Classification Search
CPC .................................................. G06F 3/048–05
See application file for complete search history.

(56) References Cited

U.S. PATENT DOCUMENTS

| 7,467,351 B1* | 12/2008 | Spells | G06F 40/103 |
| | | | 715/243 |
| 12,045,434 B2* | 7/2024 | Bischoff | G09B 5/02 |
| 2002/0025081 A1* | 2/2002 | Kumazawa | H04N 1/3878 |
| | | | 358/488 |
| 2004/0030443 A1* | 2/2004 | Bergoend | G06K 15/00 |
| | | | 700/213 |
| 2004/0255233 A1* | 12/2004 | Croney | G06F 40/186 |
| | | | 707/E17.118 |
| 2010/0042655 A1* | 2/2010 | Tse | G06F 16/122 |
| | | | 707/694 |
| 2014/0033026 A1* | 1/2014 | Sheridan | G06F 3/048 |
| | | | 715/769 |
| 2015/0220520 A1* | 8/2015 | Hartmann | G06F 16/319 |
| | | | 707/742 |
| 2015/0301721 A1* | 10/2015 | Clark | G06F 40/42 |
| | | | 715/780 |
| 2017/0235705 A1* | 8/2017 | Wezorek | G06Q 10/103 |
| | | | 715/229 |
| 2018/0246858 A1* | 8/2018 | Kutilek | G06F 3/0482 |

* cited by examiner

*Primary Examiner* — Daniel Rodriguez
(74) *Attorney, Agent, or Firm* — Polsinelli PC

(57) ABSTRACT

A computer-implemented method performed by one or more processors for targeted data extraction includes causing a display of a first view of a graphical user interface (GUI) displaying a plurality of graphical elements for selection; detecting a first input on a graphical user interface (GUI) selecting a first page view of a document from a plurality of documents; detecting a second input identifying an area of the first page view of the document; determining coordinates of the area of the first page view; generating a visual box based on the coordinates; causing a display of the visual box in the document on the GUI; and preserving the visual box across an additional page that is one of remaining pages of the document or pages of remaining documents of the plurality of documents such that the display of the visual box persists in the additional page on the GUI.

20 Claims, 10 Drawing Sheets

TECHNIQUES FOR TARGETED DATA EXTRACTION FROM UNSTRUCTURED SETS OF DOCUMENTS

CROSS-REFERENCE TO RELATED APPLICATIONS

This application is also related to U.S. Non-Provisional patent application Ser. No. 19/050,830, filed on Feb. 11, 2025, entitled "Techniques for Targeted Data Extraction from Unstructured Sets of Documents" and U.S. Non-Provisional patent application Ser. No. 19/066,964, filed on Feb. 28, 2025, entitled "Improved Character Recognition Techniques for Data Analysis in Large Sets of Documents"; the contents of which are hereby expressly incorporated by reference in their entirety.

In some aspects, text or content from the one or more regions or boxes is recognized and extracted using optical character recognition (OCR) processing techniques such as, Tesseract. Various examples for improving character recognition in a selected box are described in U.S. Applications. Ser. No. 19/066,964 filed on Feb. 28, 2025, the content of which are incorporated herein by reference in their entirety.

FIELD OF DISCLOSURE

The present technology relates to the field of data mining and document review, and in particular techniques for targeted data extraction from unstructured sets of documents.

BACKGROUND

In today's digital age, with an ever-growing reliance on online communications, cybersecurity has become a critical priority for organizational management teams. Robust safeguards are essential to prevent or effectively mitigate cybersecurity breaches. However, in the event of such breaches (cyber incidents), organizations often rely on manual data review processes to identify compromised information and fulfill notification requirements.

This manual approach is fraught with inefficiencies—it is slow, error-prone, and ill-suited to address the increasing complexity and volume of modern data ecosystems. Teams are required to sift through diverse data types, languages, and formats, making this an arduous task that frequently results in delays and inaccuracies. Furthermore, the unstructured nature of the data poses significant challenges to efficient document processing, highlighting the urgent need for innovative solutions to address these inefficiencies.

SUMMARY

In one aspect, a computer-implemented method for targeted data extraction is disclosed. The computer-implemented method includes (i) causing a display, by one or more processors, of a first view of a graphical user interface (GUI) displaying a plurality of graphical elements for selection, each graphical element of the plurality graphical elements corresponds with a respective document from a plurality of documents; (ii) detecting, by the one or more processors, a first input on the GUI selecting a first page view of a document from the plurality of documents, wherein the document is identified by selection of a respective graphical element associated with the document from among the plurality of graphical elements; (iii) detecting, by the one or more processors, a second input identifying an area of the first page view of the document; (iv) determining, by the one or more processors, coordinates of the area of the first page view; (v) generating, by the one or more processors, a visual box based on the coordinates; (vi) causing a display, by the one or more processors, of the visual box in the document on the GUI; and (vii) preserving, by the one or more processors, the visual box across an additional page, the additional page being one of remaining pages of the document or pages of remaining documents of the plurality of documents such that the display of the visual box persists in the additional page on the GUI.

In another aspect, the computer-implemented method further includes extracting, by the one or more processors, data corresponding to a portion of the document displayed on the GUI using the visual box for further processing.

In another aspect, the data is extracted using an optical character recognition technique.

In another aspect, the computer-implemented method further includes extracting, by the one or more processors, data corresponding to the visual box from the additional page upon navigating to the additional page for further processing.

In another aspect, the second input is based on one of a click or a drag of a mouse on the GUI.

In another aspect, preserving the visual box includes identifying, by the one or more processors, an area on the additional page using the coordinates, and displaying, by the one or more processors, the visual box on the area of the additional page.

In another aspect, the computer-implemented method further includes determining, by the one or more processors, a number of possible areas corresponding to information of interest in the first page view; and visually presenting, by the one or more processors, the number of possible areas on the GUI, wherein the second input is a selection of one of the number of possible areas as the area of the first page view.

In another aspect, the number of possible areas are determined using a trained neural network.

In one aspect, a system for targeted data extraction is disclosed. The system includes at least one memory configured to store computer-readable instructions; and at least one processor communicatively coupled with the at least one memory, and configured to execute the computer-readable instructions to: (i) cause a display of a first view of a graphical user interface (GUI) displaying a plurality of graphical elements for selection, each graphical element of the plurality graphical elements corresponds with a respective document from a plurality of documents; (ii) detect a first input on the GUI selecting a first page view of a document from the plurality of documents, wherein the document is identified by selection of a respective graphical element associated with the document from among the plurality of graphical elements; (iii) detect a second input identifying an area of the first page view of the document; (iv) determine coordinates of the area of the first page view; (v) generate a visual box based on the coordinates; (vi) cause a display of the visual box in the document on the GUI; and (vii) preserve the visual box across an additional page, the additional page being one of remaining pages of the document or pages of remaining documents of the plurality of documents such that the display of the visual box persists in the additional page on the GUI.

In one aspect, one or more non-transitory computer-readable media (CRM) including computer-readable instructions is disclosed. The computer-readable instructions when executed by at least one processor of at least one computing device cause the at least one computing device to: (i) cause a display of a first view of a graphical user interface (GUI) displaying a plurality of graphical elements for selection, each graphical element of the plurality graphical elements corresponds with a respective document from a plurality of documents; (ii) detect a first input on the GUI selecting a first page view of a document from the plurality of documents, wherein the document is identified by selection of a respective graphical element associated with the document from among the plurality of graphical elements; (iii) detect a second input identifying an area of the first page view of the document; (iv) determine coordinates of the area of the first page view; (v) generate a visual box based on the coordinates; (vi) cause a display of the visual box in the document on the GUI; and (vii) preserve the visual box across an additional page, the additional page being one of remaining pages of the document or pages of remaining documents of the plurality of documents such that the display of the visual box persists in the additional page on the GUI.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
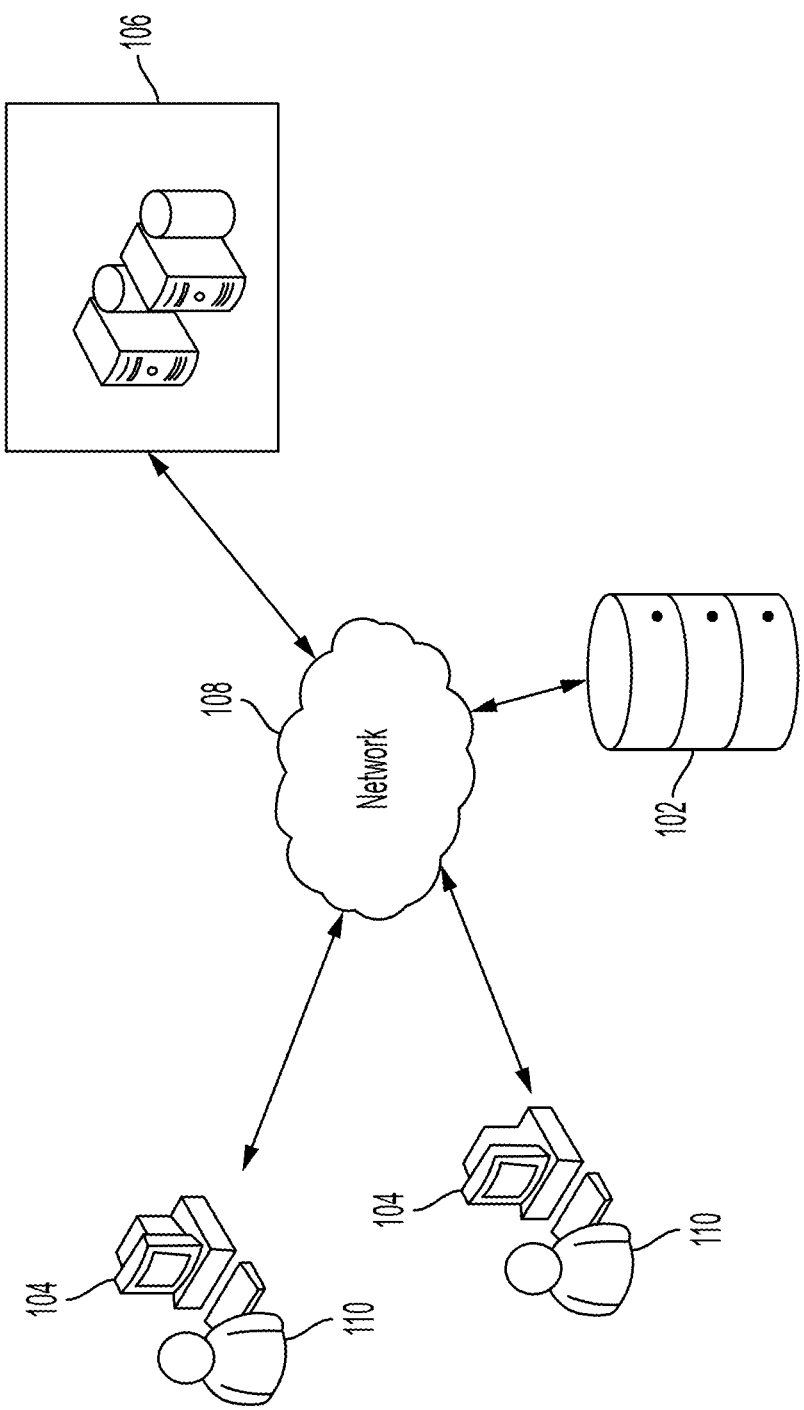
FIG. 1 illustrates a block diagram of an example network diagram according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable unless the term "configurable" is explicitly used to distinguish from "configured." The proper understanding of the term will be apparent to persons of ordinary skill in the art in the context in which the term is used.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

As used herein, the term "configured" shall be considered to be used interchangeably with configured and configurable, unless the term "configurable" is explicitly used to distinguish from "configured." The proper understanding of the term will be apparent to persons of ordinary skill in the art in the context in which the term is used.

Various technical features may be readily apparent to one skilled in the art from the following figures, descriptions, and claims.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Aspects of the present disclosure can be implemented in any device, system or network that is capable of communicating with one or more client devices and one or more databases over a network. Alternatively, various aspects of the present disclosure can be implemented at a client device that is configured to store a plurality of documents at a local memory or access the plurality of documents stored at the one or more databases. The one or more databases are stored at one or more database servers.

As noted above, cybersecurity is an ever-present concern for any individual and/or organization with online presence. Robust safeguards are essential to prevent or effectively mitigate cybersecurity breaches. However, in the event of such breaches (cyber incidents), organizations often rely on manual data review processes to identify compromised information and fulfill notification requirements. This manual approach is fraught with inefficiencies—it is slow, error-prone, and ill-suited to address the increasing complexity and volume of modern data ecosystems.

Accordingly, aspects of the present disclosure are directed to addressing challenges associated with data/document review processes. In the present case, the data review processes are described in accordance with identifying, extracting, and compiling compromised information, meeting notification requirements, and/or any other known or desired data processing task. However, the data review processes, as described herein, may be used for other use cases as well, and solves issues riddled with inefficiencies, slow and error-prone processing due to growing complexity and volume of today's data structures.

A pipeline (which can be automated), according to various aspects of the present disclosure, streamlines handling of data stored in a plurality of documents. By way of an example, the plurality of documents includes data stored in portable document format (PDF) files. However, data stored in another format files, for example, word, etc., fall within the scope of the present disclosure.

The automated pipeline includes a frontend application, which may also be referenced herein as a box selector application. The box selector application enables a user of the frontend application to view a plurality of documents and select a document of the displayed plurality of documents. The user can view the selected document on the graphical user interface and interactively select an area within a document to retrieve coordinates of the box. Such area can be selected using a rectangular box, a square box, or any other shape whose boundaries can be determined or deduced via specification of one or more numerical coordinates. An area may be selected as being of interested, because upon inspection, it may be determined that information of interest (e.g., personal identifying information such as names, addresses, social security numbers, patient information, and/or any other type of information of interest) are present in that area. The process of selecting an area may be referred to as boxing and the selected area may be referred to as the box.

As will be described below, selection of an area on a particular page, not only allows the system to extract information present in the box, doing so further enhances the ability of the system to preserve the selected area across additional pages (e.g., remaining pages of a document, pages having similar format as the current page, etc.) and automatically extract information within that area across other pages.

In other words, boxing a particular area in a document may suggest that similar areas on other pages may contain similar information of interest. For instance, a given page of a medial record may be boxed to indicate presence of patient identifying information for patient 1. This is indicative of the likelihood or possibility of other similar pages having patient identifying information of either patient 1 or other patients present in a similar area on those pages. Therefore, as will be described in more detail below, selecting/boxing an area on a given page can facilitate an efficient analysis of large sets of documents (which may or may not be structured in a particular format) to determine what information of interest exist in such large sets and/or what information of interest may have been compromised due to a security breach, for example.

The coordinates of the box are used for data extraction from the plurality of documents. In other words, from each page of each document of the plurality of documents, content present at the same coordinates is selected for various actions including, but not limited to, text extraction operation, text editing operation, and/or text structuring operation. By way of an example, various actions may be performed on the plurality of documents as a batch process.

The frontend application integrates document rendering and user interaction capabilities using, for example, the fitz library that is part of the PyMuPDF package, for handling documents that are PDF files. Additionally, tools like tkinter may be used to create a user-friendly graphical user interface.

FIG. 1 illustrates a block diagram of an example network diagram according to some aspects of the present disclosure. As depicted in FIG. 1, the example environment 100 includes client devices 104, a server 106 and a remote database 102 that are communicatively coupled with each other via a network 108. In some examples, the network 108 may include, but is not limited to, a Local Area Network (LAN), a Wide Area Network (WAN), the Internet, or a combination thereof. In some examples, the network 108 may be accessed over a wired and/or a wireless communication link.

The remote database 102 may be in a cloud node maintained by a Cloud Service Provider (CSP) or a cloud vendor. The remote database 102 may store a plurality of documents that can be accessed by the server 106 and/or the client devices 104 for performing one or more operations, as described herein. In some examples, the operations may include data storage operations, data processing operations, and/or the like. The plurality of documents stored in the remote database 102 may be in PDF format, word format, or any other known or to be developed format.

In some examples, the computing resources at the server 106 may include network resources, data storage, servers, applications, and services. Example of the network resources may include routers, network bandwidth, network management software, and/or the like. Examples of the data storage may include storage resources, memory, Random Access Memory (RAM), databases, and/or the like. Examples of the servers may include processors, hardware servers, Virtual Machines (VMs), hypervisor, containers, and/or the like. Examples of the applications and services may include email applications, data collection/processing applications, accounting applications, Human Resource (HR) related applications, medical related applications, and/or the like. In some examples, the resources at the server 106 may include cloud resources, cloud computing resources, or the like.

The client devices 104 may be associated with the entity (also referenced herein as a user or operator, or the like) and used by users 110 of the client devices 104 (users may also be referred to as operators). In some examples, each of the users may include an organization, a corporation, a business unit of a corporation, a department of a corporation, a banking unit, a medical/healthcare unit, and/or the like. In some examples, each of the users 110 may include an administrator, a subject matter expert (SME), an investigator, and/or the like. Examples of the client devices 104 may include a desktop, smartphones, laptops, a tablet, voice-enabled devices, and/or the like. It is contemplated that the implementations of the present disclosure may be realized with any appropriate type of computing device.

The client devices 104 may be utilized by a respective user of the users 110 to log into and interact with the server 106 for handling of data stored in the plurality of documents, which are stored in the remote database 102. The server 106 implements the automated pipeline that is configured to identify and categorize unique templates in each of the plurality of documents. Each document of the plurality of documents may be a PDF file. The server 106 is configured to perform pairwise comparison to group similar files into a plurality of clusters. As described herein, the same PDF file can be part of more than one cluster, and each cluster is configured to process the files included in that cluster as a batch process, for example, for data analysis, data mining, and/or data processing.

In some examples, the client devices 104 may display one or more Graphical User Interfaces (GUIs) that enable the respective user to interact with the server 106 and/or the remote database 102 for batch processing of the plurality of documents stored at the remote database 102. Interacting with the server 106 may include initiating a request to display a plurality of documents in a GUI and selecting two or more documents of the plurality of documents for batch processing. Alternatively, the server 106 may periodically perform batch processing of the plurality of documents.

In some examples, the server 106 may be implemented as an on-premises system. In some other examples, the server 106 may be implemented as an off-premises system (for example, a cloud or an on-demand system). Additionally, or alternatively, the server 106 may be implemented in a cloud environment. For simplicity, the server 106 depicted in FIG. 1 may be a cloud environment that is intended to represent various forms of servers including a web server, an application server, a proxy server, a network server, a server pool, and/or the like.

Figure 2:
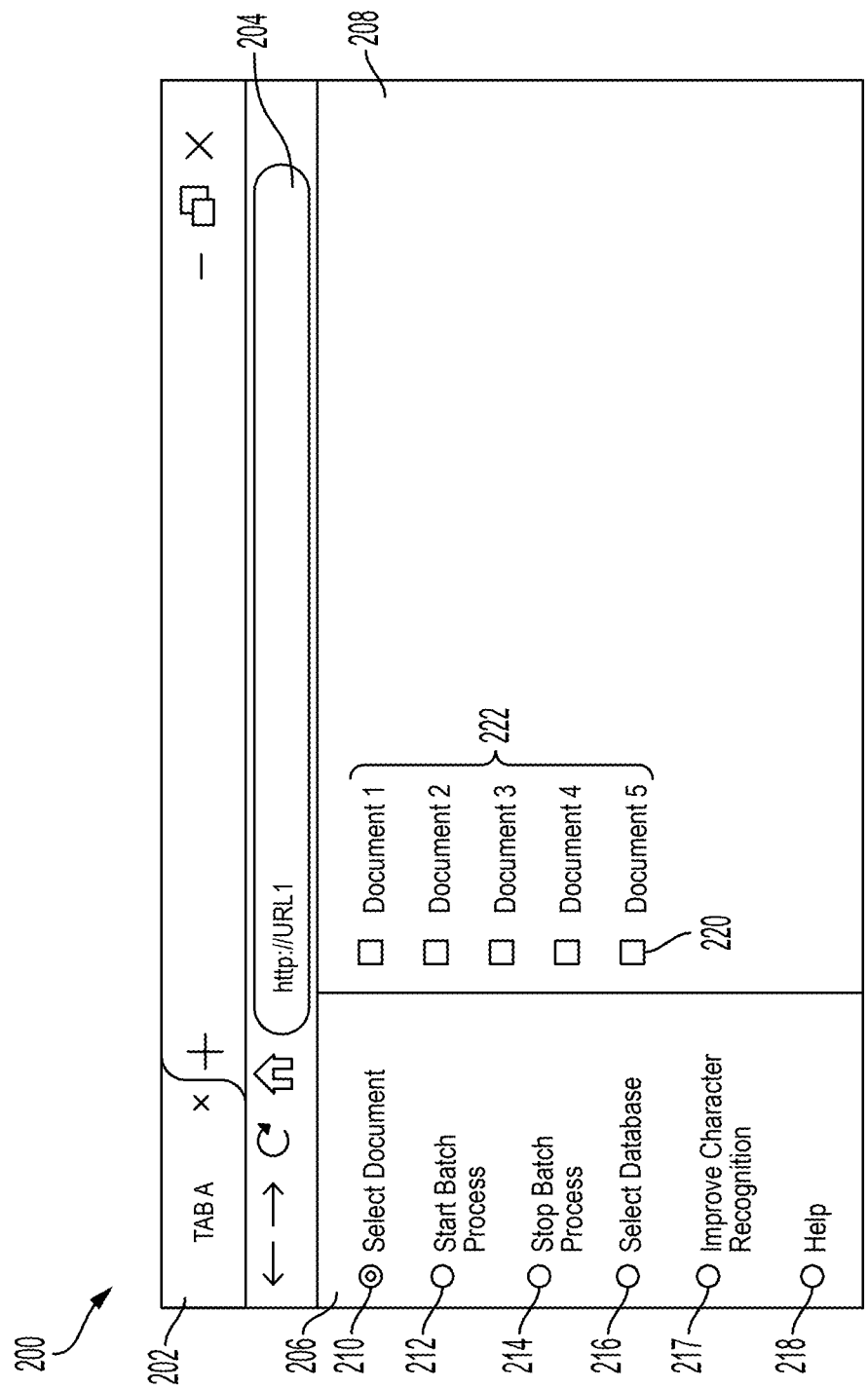
FIG. 2 illustrates an example view of a graphical user interface of a frontend application executing on a client device according to some aspects of the present disclosure.

FIG. 2 illustrates an example view 200 of a graphical user interface (GUI) of a frontend application executing on a client device 104 according to some aspects of the present disclosure. The frontend application may be a web browser application, a mobile application, or a native application executing on the client device 104. The frontend application executing on the client device 104 may be communicatively coupled with a backend application executing on the server 106. The backend application executing on the server 106 is communicatively coupled with the remote database 102. Additionally, or alternatively, the frontend application executing on the client device 104 may also be communicatively coupled with the remote database 102.

As shown in the view 200 of the GUI, the frontend application may connect with the backend application by accessing a uniform resource locator (URL) address in an address bar 204 of a tab 202. Upon establishing a connection between the frontend application and the backend application using HyperText Transfer Protocol (http) or HyperText Transfer Protocol Secure (https), the backend application executing on the server 106 may render a page for displaying on the GUI as shown in FIG. 2. The page rendered for display on the frontend application may include a menu selection pane 206 and a data display and selection pane 208 (a selection pane may also be referred to as a selection window, a selection frame, a selection section, etc.).

The menu selection pane 206 may display a plurality of menu options including, but not limited to, a select documents option 210, a start batch process option 212, a stop batch process option 214, a select database option 216, and a help option 218. The help option 218 may provide the user various information such as documentation about using the user interface shown in FIG. 2 for selecting various documents for various operations. Various operations that may be performed on one or more documents may include, but not limited to, text extraction, text editing, text structuring, data mining, etc. Various operations on the one or more documents may be performed as batch processing operations.

The database stores a plurality of documents, and upon selecting the database, a plurality of documents stored in the database are displayed in the data display and selection pane 208 by selecting the select documents option 210. Upon selection of the select documents option 210, document 1, document 2, document 3, document 4, and document 5 are displayed in the data display and selection pane 208 as 222. One or more documents displayed in the data display and selection pane 208 may be selected using their respective checkbox that is shown in FIG. 2 as checkbox 220. The one or more documents such selected using a respective checkbox may be batch processed upon selecting the start batch process option 212. The stop batch process option 214, once selected, stops (or terminates) the batch process, which may be for any reason. Assuming that the user has selected a checkbox corresponding to one of the displayed documents, for example, document 1, document 1 may be displayed on the GUI. Various GUIs related to display of the document 1 for targeted data extraction are described below with reference to FIGS. 3A-3E, and 4.

Figure 3A:
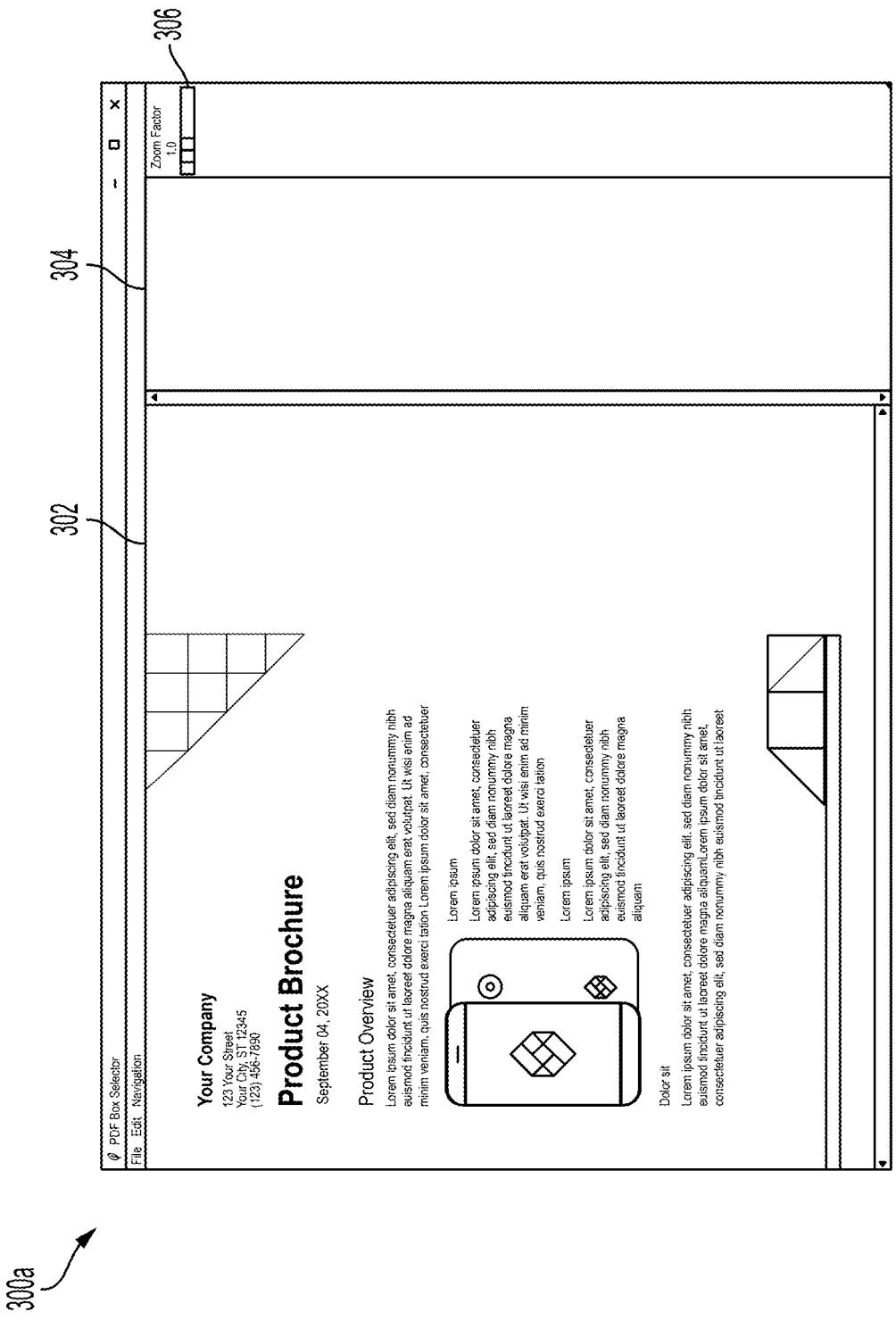
FIGS. 3A to 3E illustrate other example views of the graphical user interface of the frontend application executing on the client device according to some aspects of the present disclosure.

FIG. 3A illustrates an example view 300a of the GUI of the frontend application executing on the client device according to some aspects of the present disclosure. The view 300a may include multiple sections including a first section 302, a second section 304, and a third section 306. The first section 302 may display a page of the selected document using a checkbox 220, as shown in FIG. 2. The third section 306 may display a zoom control interface, and the second section 304 may display coordinates of one or more areas selected by the user, as described in detail below. The second section 304 displays coordinates of one or more boxes selected by a user, as described herein. Additionally, or alternatively, the second section 304 may also display a respective page number of the selected document from which each of the one or more boxes are selected.

The zoom control interface may allow the user to change a zoom level of the page of the selected document displayed in the first section 302. By way of an example, the zoom level of the page of the selected document displayed may be changed using a zoom factor. In some examples, the zoom factor may be adjusted from 0.1 to 5.0 by changing a scale weight.

Figure 3B:
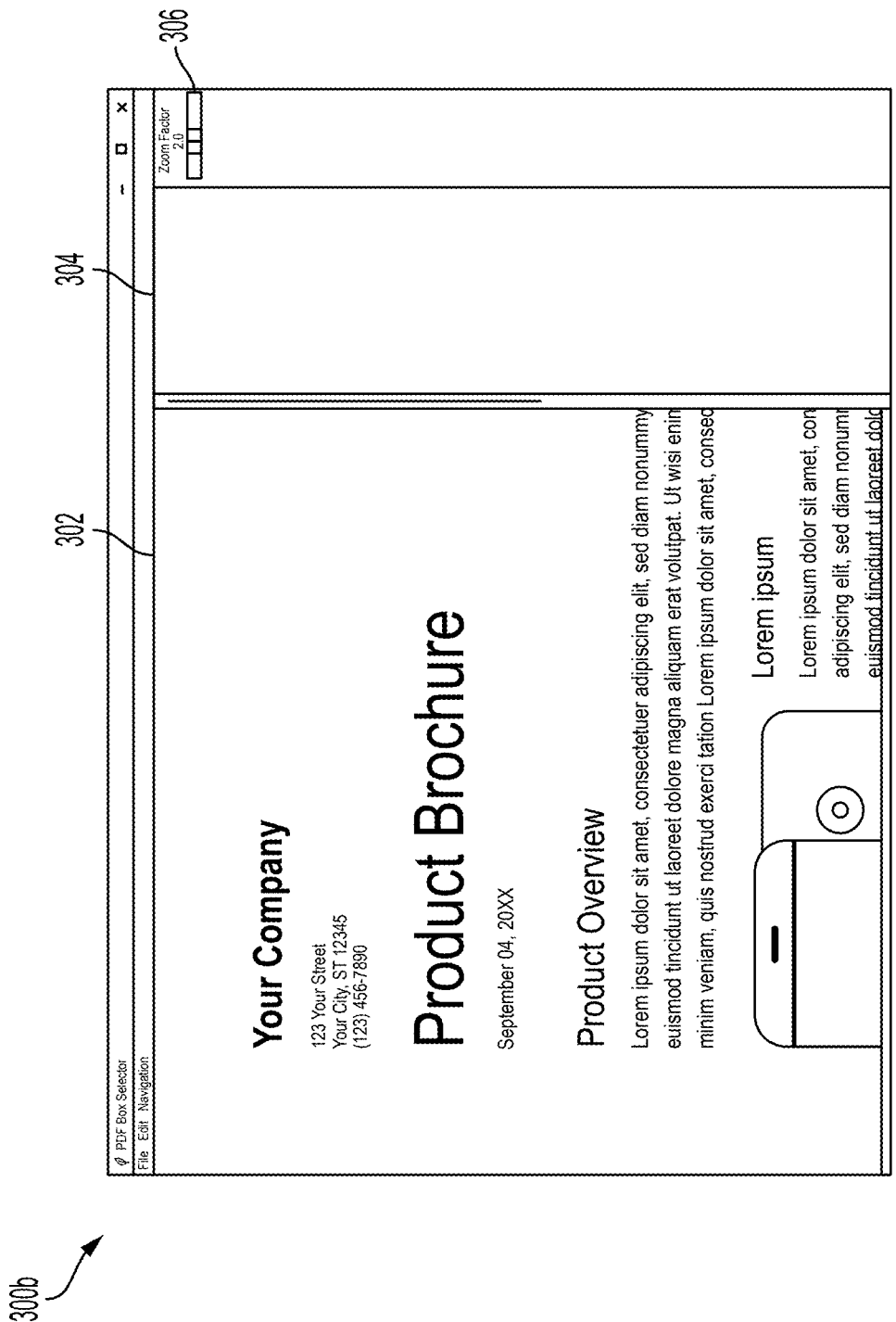

FIG. 3B illustrates another example view 300b of the GUI of the frontend application executing on the client device according to some aspects of the present disclosure. As shown in the view 300b, the scale weight is set to adjust the zoom factor to 2.0 from the zoom factor of 1.0 in FIG. 3A. As a result of adjusting the zoom factor to 2.0, content of the page of the selected document in the first section 302 is adjusted in accordance with the selected zoom factor.

Figure 3C:
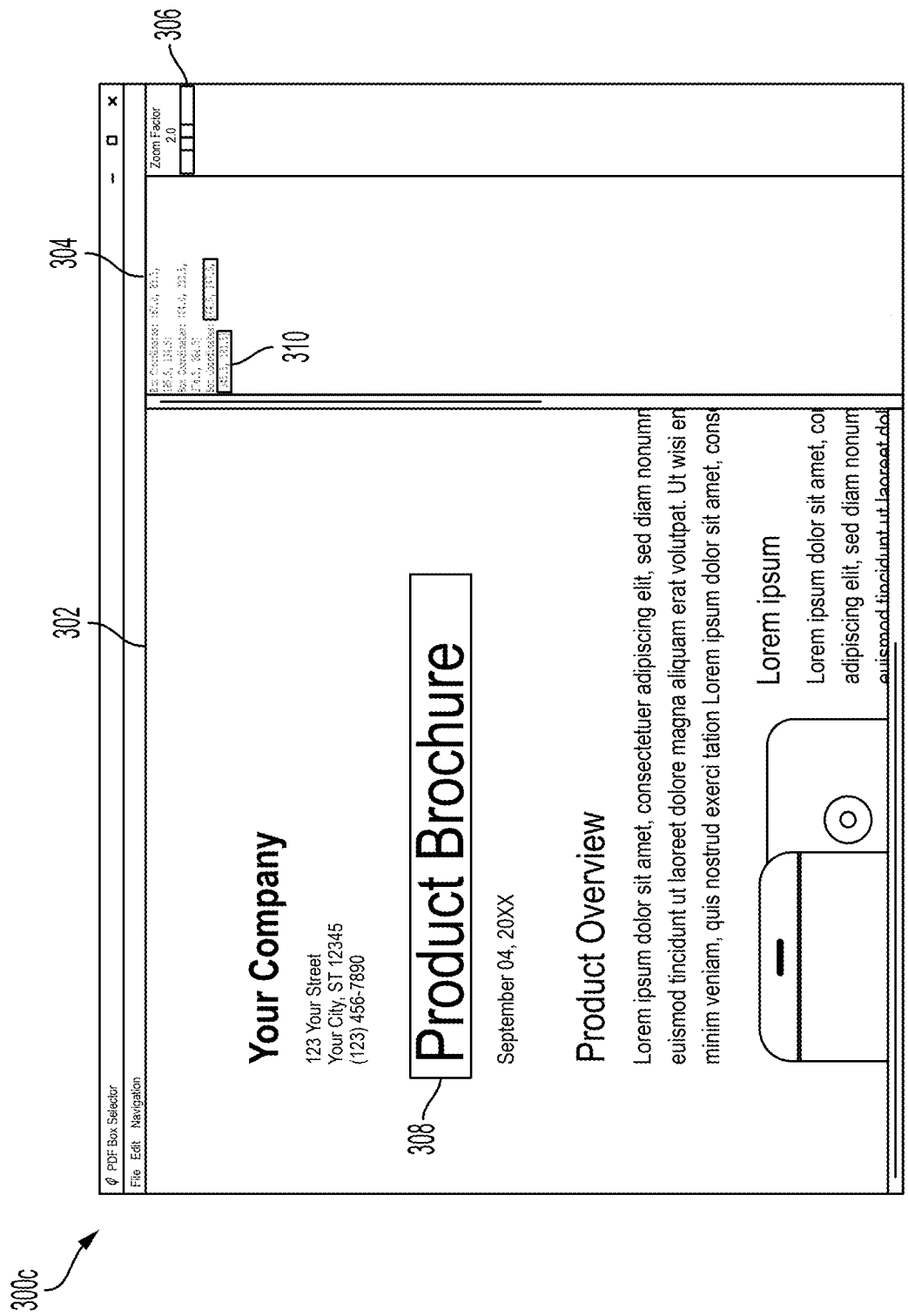

FIG. 3C illustrates another example view 300c of the GUI of the frontend application executing on the client device according to some aspects of the present disclosure. As shown in the view 300c, the user may select a box 308 around content of the page displayed in the first section 302. While the box 308 shown in the view 300c may be selected of a rectangular shape, the box of any other shape may also be selected by the user. The box 308 may be selected by the user by clicking or dragging of a mouse on the GUI.

Upon selection of the box 308 by the user, coordinates of the box 308 may be displayed in the second section 304 as 310. By way of an example, coordinates 310 of the box 308 displayed in the second section 304 may include coordinates of a top-left corner, e.g., $(x_1, y_1)$, and a bottom-right corner, e.g., $(x_2, y_2)$, of the box 308. Additionally, or alternatively, a respective page number of the document on which the box 308 appears or selected may also be displayed in the second section 304.

The coordinates of the box 308 may be used for various batch processing operations or tasks across other pages of the same document or pages of other documents of the plurality of documents. As described herein, various batch processing operations or tasks may include, identifying and grouping various pages of a plurality of documents, scrapping data from similar regions across multiple documents. Additionally, or alternatively, various batch processing operations or tasks may include text extraction and/or text structuring of text included in a box located at the coordinates of the box 308 on other pages of the same document or pages of other documents of the plurality of documents.

Additionally, the user may navigate to other pages of same document by using a control option (e.g., next page or previous page, not shown in FIG. 3C) that may be likely available under a Navigation menu (not labeled in FIG. 3C). One or more boxes selected by the user across different pages of the document may be displayed in the second section 304, as described herein. Further, one or more boxes with their respective coordinates and page number (if applicable) displayed in the second section 304 are used for various batch processing operations or tasks.

In some aspects, one or more regions (areas or boxes) on a page of a document may be automatically suggested for selection. The suggested boxes may be automatically determined using a trained neural network, which will be further described below with reference to FIG. 5. For instance, a neural network may be trained overtime, either through user inputs and/or various detection mechanism to identify sensitive information (e.g., personally identifiable information, etc.) and suggest regions (areas or boxes) that accurately (and almost-exclusively) encompass the identified sensitive information. Identification of boxes around sensitive information that minimizes inclusion of non-sensitive information reduces noise and increases accuracy of detection and extraction of the relevant content (e.g., the sensitive information). In other words, suggested boxes may be tightly aligned with the sensitive information included therein. Because the suggested regions (areas or boxes) are tightly aligned with the relevant context, a number of false positives and/or inclusion of unrelated content may be avoided. Once regions with potential sensitive information are identified, those regions may be boxed and displayed on a GUI as suggested boxes for ultimate selection.

Figure 3D:
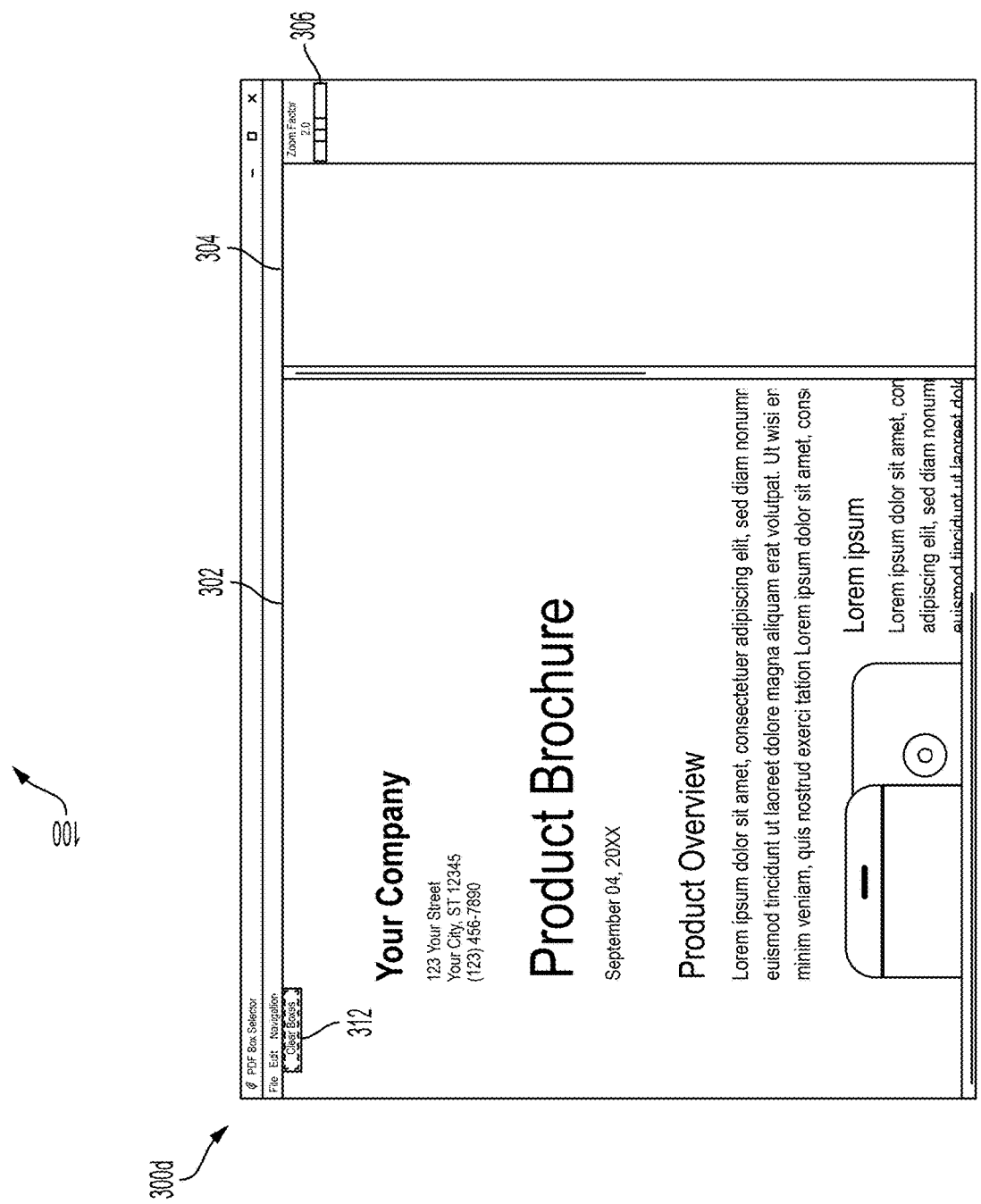

FIG. 3D illustrates another example view 300d of the GUI of the frontend application executing on the client device according to some aspects of the present disclosure. As shown in the view 300d, one or more regions on the displayed page may be distinguishably displayed as suggestions. As shown in the view 300d, area 314 and area 316 may be automatically identified by the server 106 (e.g., using a trained neural network) and displayed to the user as visually distinguishable from other areas on the displayed page. By way of an example, a box may be drawn around the area covering each of the one or more regions with a different color lines or shading. Alternatively, the box may have different type of dash lines. As noted, a neural network described herein with reference to FIG. 5 below may be used to provide one or more suggestions for selection of the bounding boxes.

Figure 3E:
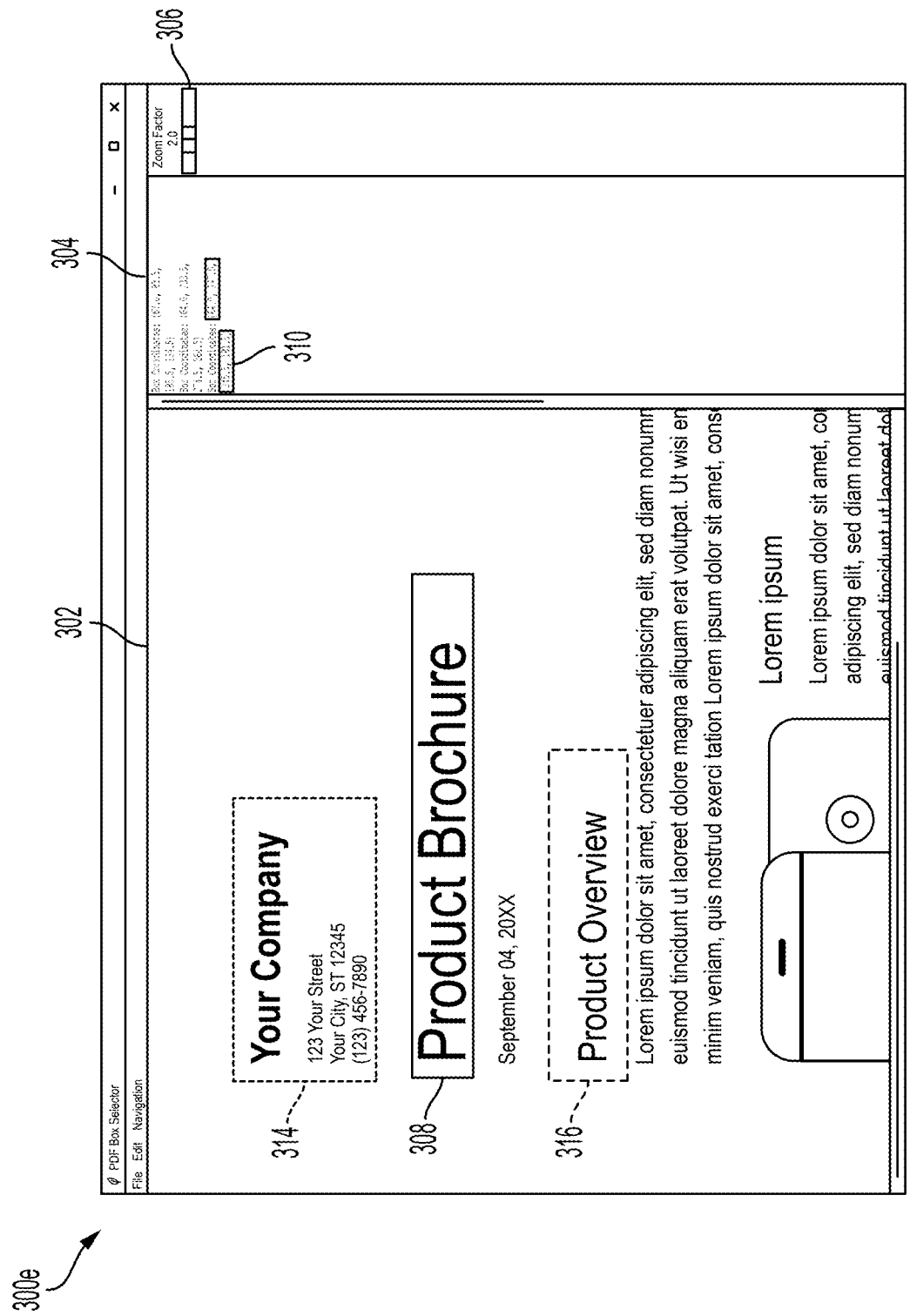

FIG. 3E illustrates another example view 300e of the GUI of the frontend application executing on the client device according to some aspects of the present disclosure. As shown in the view 300e, the user may select an option Clear Boxes 312 to clear or remove selected boxes from one or more documents of a plurality of documents. As a result of the user selecting the option Clear Boxes 312, all selected box and their respective coordinates shown in the second section 304 may be deleted or removed.

The first section 302 in FIGS. 3A-3E may also include a horizontal scrollbar and/or a vertical scrollbar for navigation and view the content of the displayed pages in accordance with a selected zoom level for the displayed page using the zoom control interface. As the user selects an area on the content of the displayed page in the first section 302 to draw a box, coordinates of the box are displayed in the second section 304 in real time. The zoom control interface shown in the third section 306 are applicable for all pages of the document, and for all documents. Further, the zoom control interface in the third section 306 affects both the rendering of the content of the page and precision of the box selection.

The various views of the GUI of the frontend application thus enables various key functions for the user. As described herein, various key functions includes a box selection function, a document content rendering function, a coordinate logging function for a plurality of boxes, navigation to other pages of the document, navigation to other documents, and/or various document related actions such as, opening a document, closing a document, clearing a selected box, navigating to other pages of a document, etc.

A plurality of boxes selected and displayed in the second section 304 may be processed using batch processing. Various operations, as described herein, may be performed as batch processing using python or other scripting languages that are integrated into a KNIME workflow. The python or other scripting languages may be used to generate a script for performing various operations or tasks on the content associated with the one or more boxes associated with one or more documents of the plurality of documents.

Accordingly, extraction of specific data from predefined regions of one or more documents may be automated based upon, or using, the coordinates of the one or more boxes derived from each document. A script, for example, a Python script, may be used to extract the relevant data from the specified areas, and store the information in a structured format that can be easily used for further analysis within the KNIME environment.

The script may support functionalities such as, accessing or identifying a list of a plurality of documents including a directory path for each document of the plurality of documents, opening or closing a document of the plurality of documents for content viewing and selecting one or more boxes, extracting text and/or content from each of the one or more boxes, storing the extracted text and/or content, and/or displaying the extracted text and/or content before and/or after performing an action or task using batch processing. In some examples, extracted text and/or content may be split into multiple lines, and each of the multiple lines may be added to a dictionary along with a respective page number and file path. Additionally, the script may also support techniques such as OCR for extracting text and/or content from each of the one or more boxes, and thereby converting non-machine-readable text or content to machine-readable text or content. Accordingly, such a targeted approach for applying OCR techniques ensures efficient and improved text recognition while improving accuracy and processing time.

The script thus offers various key features including, but not limited to, batch processing of the content for selected predefined regions (or boxes). Batch processing of the content may include identifying and grouping documents having similar structures/format for text or content extraction, text or content structuring, and metadata extraction. Upon batch processing of the content, the content may be stored with respective metadata in one or more databases. Non-limiting examples of data matching and batching are described in U.S. Non-Provisional patent application Ser. No. 19/050,830, filed on Feb. 11, 2025.

Accordingly, various aspects as presented herein provide benefits such as automation of various operations or tasks performed using one or more batch processing scripts, in addition to consistent and reliable data or content extraction using exact coordinates of one or more regions or boxes. Further, the batch processing script is scalable to operate upon a large number of documents in a single batch and can be easily integrated with KNIME workflow. The KNIME workflow allows seamless integration of extracted data of the one or more regions or boxes as part of the pipeline, described herein, without further manual intervention.

In some aspects, text or content from the one or more regions or boxes is recognized and extracted using optical character recognition (OCR) processing techniques such as, Tesseract. Various examples for improving character recognition in a selected box are described in U.S. application Ser. No. 19/066,964, filed on Feb. 28, 2025, entitled "Improved Character Recognition Techniques for Data Analysis in Large Sets of Documents"; the contents of which are hereby expressly incorporated by reference in their entirety.

After selecting the one or more regions or boxes (also known as bounding boxes) within the one or more selected documents, in the next step, OCR techniques are applied to the regions within the bounding boxes to convert any image-based content into machine-readable text. Converting the image-based content into machine-readable text step ensures that even if the text within the selected bounding box is part of a scanned image (such as in a scanned report or form), the text can be recognized and extracted.

As described herein, by integrating OCR techniques into the workflow, where the text inside the predefined regions (or bounding box) may not be directly accessible, may be accessed, and encoded as text in the document. As generally known, in many PDF documents, especially scanned documents, content may be embedded within images rather than text layers. Without OCR technique, content embedded within the image may be unable to be processed. By applying OCR techniques to the selected bounding boxes, the workflow ensures that even image-based content can be converted into searchable and editable text, enabling accurate extraction and further analysis.

In some aspects, an OCR engine, such as a Tesseract OCR engine, may be used to perform various text recognition tasks. Tesseract that is an open-source OCR tool or another OCR tool may be used for recognizing printed and handwritten text from images, and extracting the recognized text irrespective of the layouts, fonts, and/or orientations of the text in the images.

An OCR process flow is described herein with reference to FIGS. 3A-3E. The OCR process flow includes receiving a list of documents (e.g., PDF documents) with the directory path for each document of the list of documents, and coordinate of one or more bounding boxes from each document of the list of documents. The OCR flow further includes accessing or opening the list of documents using, for example, the fitz library, and accessing regions identified by the one or more bounding boxes based upon their respective coordinates.

For each of the one or more bounding boxes, OCR techniques are applied to an image embedded within a bounding box to extract the image and then extract text in the image irrespective of fonts, orientations, and/or layouts of the text. The extracted text is recognized using a machine-learning (ML) based character recognition model. The ML based character recognition model is configured to generate high quality output in complex and noisy document images. Additionally, since the OCR techniques are applied only to selected bounding boxes, as described herein with reference to FIGS. 3A-3E, efficiency, accessibility, customization, flexibility, data privacy and compliance, and accuracy of the batch processing operations are improved.

Additionally, noise and sensitive data may be filtered out from the extracted text from the one or more bounding boxes using named entity recognition (NER) technique. By way of an example, the NER technique may be used to identify sensitive information, for example, a name of a person, etc., and flag or filter out the sensitive information. Since the NER techniques for filtering out sensitive information in data stored in a database are known to a person skilled in the art, the NER techniques are described in more detail herein.

Any errors encountered during the batch processing may be reported, for example, using an error report. The error report may be displayed in the GUI. Additionally, or alternatively, any sensitive information included in the extracted text from the one or more bounding boxes may be identified and reported to the user using the GUI. The user may specify how the sensitive information to be processed using the GUI or by updating the script for batch processing.

Figure 4:
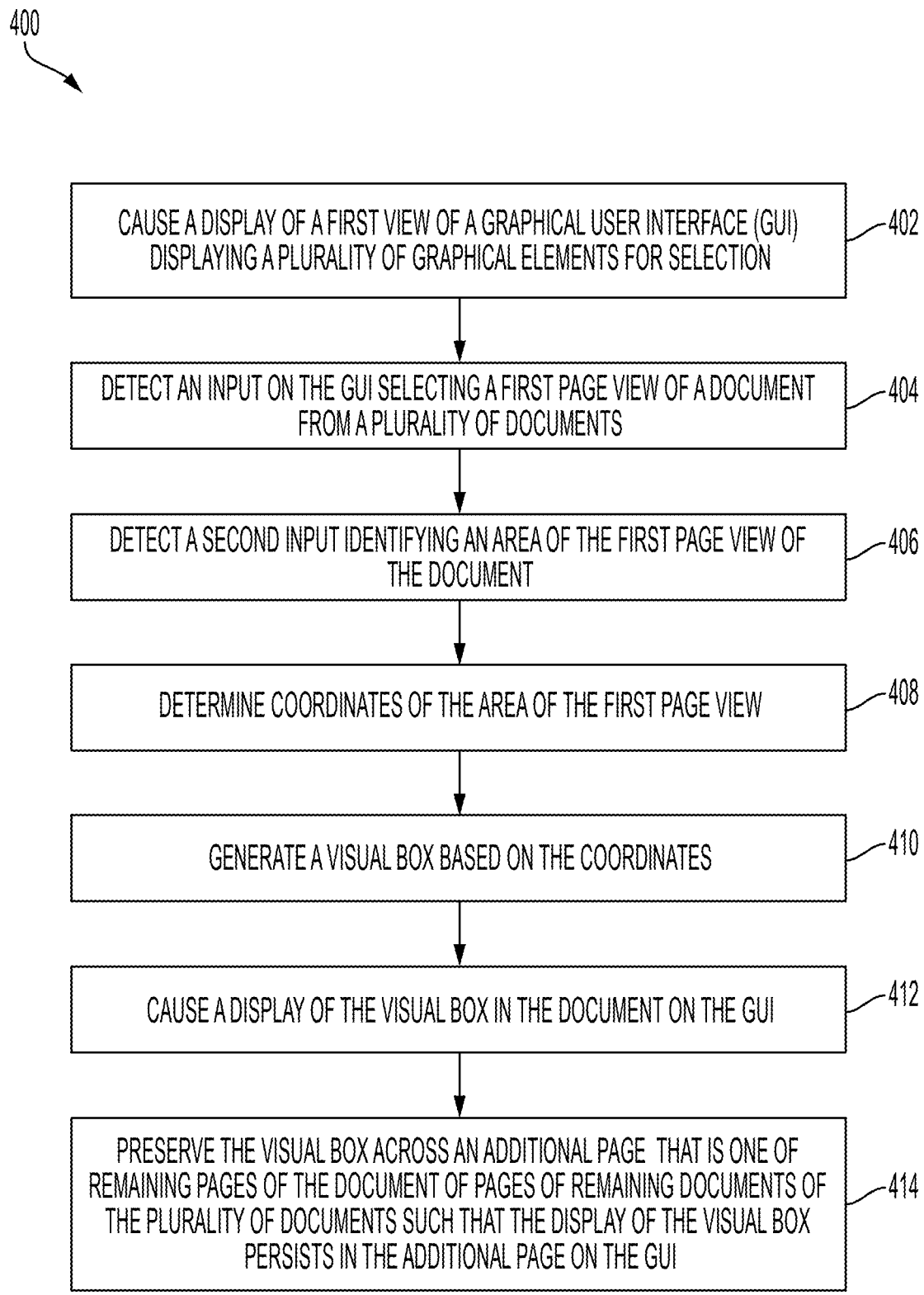
FIG. 4 illustrates an example flow chart of method operations of targeted data extraction from unstructured sets of documents according to some aspects of the present disclosure.

FIG. 4 illustrates an example flow chart 400 of method operations of targeted data extraction from unstructured sets of documents according to some aspects of the present disclosure. Method operations of the flow chart 400 may be performed by the client device 104 or the server 106.

At step 402, the server 106 may cause a display of a first view of a graphical user interface (GUI) displaying a plurality of graphical elements for selection by a user. Each graphical element of the plurality graphical elements corresponds with a respective document from a plurality of documents. The first view of the GUI displaying the plurality of graphical elements for selection by the user is shown and described herein with reference to FIG. 2.

At step 404, the server 106 may detect an input on the GUI indicative of a selection of a first page view of a document from a plurality of documents. The document is identified by selection of a respective graphical element associated with the document from among the plurality of graphical elements. For example, a document may be selected as described herein with reference to FIG. 2, and content of the document may be displayed on the GUI, as described herein with reference to FIG. 3A to FIG. 3B.

At step 406, the server 106 may detect a second input identifying an area of the first page view of the document. In other words, using the second input, a bounding box such as the box 308, as shown in FIG. 3C, may be detected.

The second input may be provided by the user by clicking or dragging a mouse on the GUI. In other words, a user input may be provided by pressing, dragging, and/or releasing actions around text that may be deemed to contain information of interest (e.g., sensitive information such as personally identifiable information, etc.). In the non-limiting example of FIG. 3C, the box 308 is shown to have been drawn to cover the term "Product Brochure." Depending on the underlying analysis to be performed, the term "Product Brochure," may or may not be of interest. In another example, the information related to the company including the name ("Your Company") and/or the company's address as shown in FIG. 3C may be of interest. Hence, a box similar to the box 308 may be drawn to cover that portion of the document that includes the Company's name and address.

As noted above, the server 106 may identify possible areas (several candidate areas with possible information of interest) automatically using a trained neural network. This process may be as described above with reference to FIG. 3D. In this example, the second input received at step 406 may be a selection of one or more of several candidate areas presented on a GUI for selection by a user.

At step 408, the server 106 may determine coordinates corresponding to the bounding box detected at step 406. In another example, the server 106 may also (or alternatively) determine the coordinates of the first page view of the document (e.g., an entire page view), as described above with reference to FIGS. 3A-3E. In one example, the visual box may be identified using coordinates of a top-left corner and a bottom-right corner of the visual box.

At step 410, the server 106 may generate a visual box corresponding to the determined coordinates of an area, a page view, etc. This box may then be displayed on a GUI (e.g., the box 308 of FIG. 3C or any other example boxes described above with reference to FIGS. 3A-3E).

At step 412, the server 106 may cause the display of the visual box generated at step 410, on the GUI.

At step 414, the server 106 may preserve the visual box across one or more additional pages of the plurality of documents. The additional page(s), as described herein, may be one of remaining pages of the document or pages of remaining documents of the plurality of documents such that the display of the visual box persists in the additional page on the GUI. Preserving the visual box across one or more additional pages of the plurality of documents may include identifying an area on the additional page using the coordinates, and displaying the visual box on the area of the additional page.

Further, the method operations may include determining a number of possible areas corresponding to information of interest in the first page view, and visually presenting the number of possible areas on the GUI as shown in FIG. 3D.

By way of an example, the second input may be a selection of one of the number of possible areas as the area of the first page view. In some examples, the number of possible areas are determined using a trained neural network, as described herein with reference to FIG. 5.

Further, the method operations may include extracting data corresponding to a portion of the document displayed on the GUI using the visual box. Additionally, using the navigational menu options, the user may navigate to other page and may identify an additional visual box for extracting data corresponding to the additional visual box as well. The additional visual box may also be displayed on the GUI, for example, as shown in the second section 304 in FIG. 3A to FIG. 3C.

The data may be extracted using OCR techniques described herein, and the coordinates as well as extracted or modified content of the visual box may be stored in one or more databases. The one or more databases may either be a local or a remote database. The coordinates of the visual boxes may be displayed for possible future selected in the second section 304, as shown in FIG. 3C. Additionally, as described herein, respective data corresponding to the visual box across the plurality of documents may be extracted and batch processed.

Figure 5:
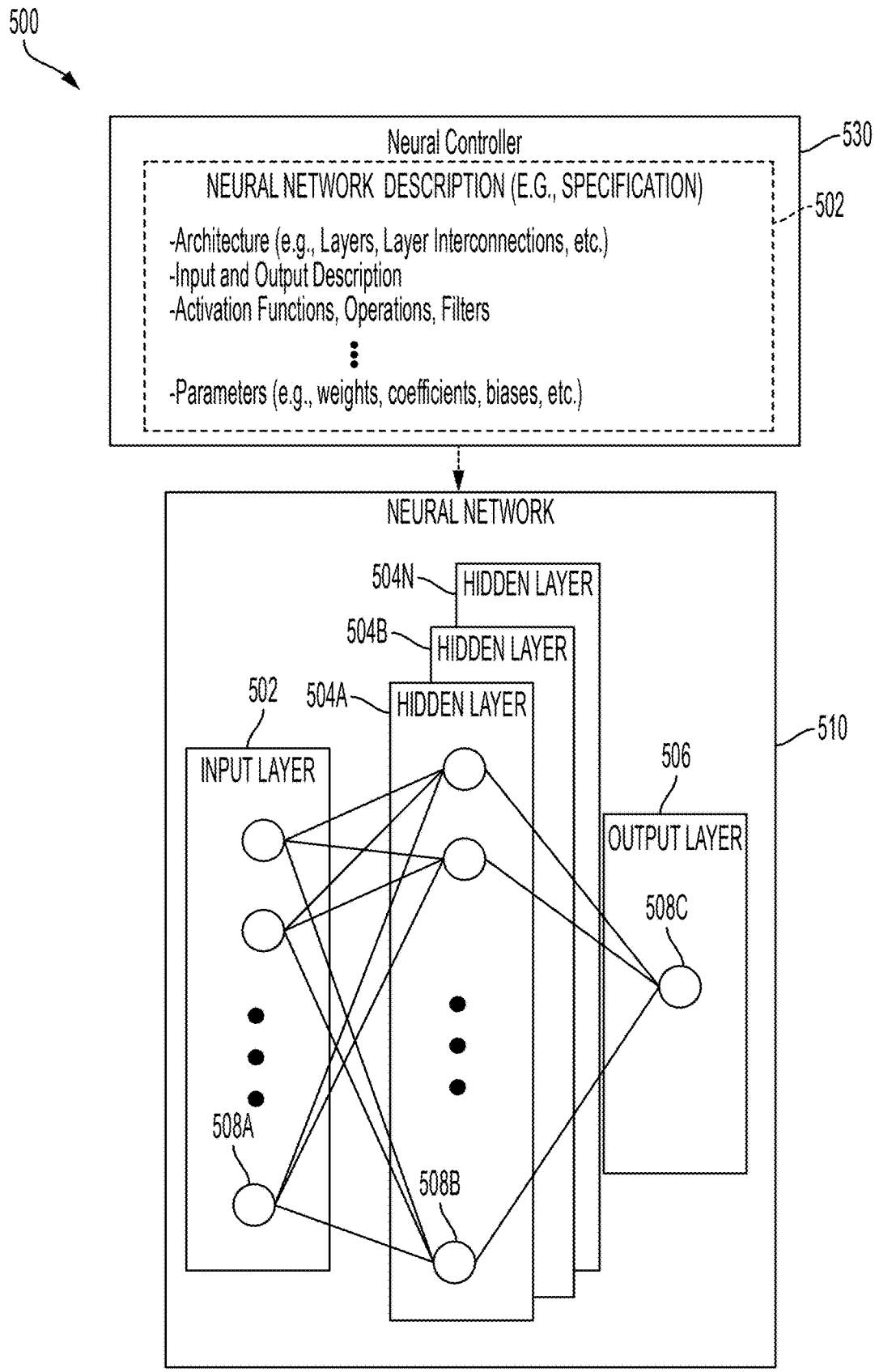
FIG. 5 illustrates an example neural network architecture according to some aspects of the present disclosure.

FIG. 5 illustrates an example neural network architecture, according to one aspect of the present disclosure. Architecture 500 may be trained and used for automatic identification of possible areas that include information of interest as described above with reference to FIG. 3D and FIG. 4.

Architecture 500 includes a neural network 510 defined by an example neural network description 501 in rendering engine model (neural controller) 530. The neural network 510 can represent a neural network implementation of a rendering engine for rendering media data. The neural network description 501 can include a full specification of the neural network 510, including the neural network architecture 500. For example, the neural network description 501 can include a description or specification of the architecture 500 of the neural network 510 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 510 reflects the architecture 500 defined in the neural network description 501. In this example, the neural network 510 includes an input layer 502, which includes input data. In one illustrative example, the input layer 502 can include data representing a portion of the input media data or images corresponding to the input media data (e.g., images of the plurality of documents). Alternatively, the input layer 502 can include data representing a plurality of pages of a plurality of documents to identify and suggest one or more boxes for the user to select.

During the training phase of the neural network 510, input data can include, but are not limited to, manual selections and/or identifications of areas/boxes by a user on a GUI, description of various types of information of interest, etc. The input data is then used to train the neural network to automatically identify one or more areas or boxes that cover information of interest that would then be provided at the output layer 506.

The neural network 510 includes hidden layers 504A through 504N (collectively "504" hereinafter). The hidden layers 504 can include n number of hidden layers, where n is an integer greater than or equal to one. The number of hidden layers can include as many layers as needed for a desired processing outcome and/or rendering intent. The neural network 510 further includes an output layer 506 that provides an output (e.g., rendering output) resulting from the processing performed by the hidden layers 504. In one illustrative example, the output layer 506 may provide (e.g., on GUI) one or more boxes as candidate areas that include information of interest, examples of which are described above with reference to FIG. 3D.

The neural network 510 in this example is a multi-layer neural network of interconnected nodes. Each node can represent a piece of information. Information associated with the nodes is shared among the different layers and each layer retains information as information is processed. In some cases, the neural network 510 can include a feed-forward neural network, in which case there are no feedback connections where outputs of the neural network are fed back into itself. In other cases, the neural network 510 can include a recurrent neural network, which can have loops that allow information to be carried across nodes while reading in input.

Information can be exchanged between nodes through node-to-node interconnections between the various layers. Nodes of the input layer 502 can activate a set of nodes in the first hidden layer 504A. For example, as shown, each of the input nodes of the input layer 502 is connected to each of the nodes of the first hidden layer 504A. The nodes of the hidden layer 504A can transform the information of each input node by applying activation functions to the information. The information derived from the transformation can then be passed to and can activate the nodes of the next hidden layer (e.g., 504B), which can perform their own designated functions. Example functions include convolutional, up-sampling, data transformation, pooling, and/or any other suitable functions. The output of the hidden layer (e.g., 504B) can then activate nodes of the next hidden layer (e.g., 504N), and so on. The output of the last hidden layer can activate one or more nodes of the output layer 506, at which point an output is provided. In some cases, while nodes (e.g., nodes 508A, 508B, 508C) in the neural network 510 are shown as having multiple output lines, a node has a single output and all lines shown as being output from a node represent the same output value.

In some cases, each node or interconnection between nodes can have a weight that is a set of parameters derived from training the neural network 510. For example, an interconnection between nodes can represent a piece of information learned about the interconnected nodes. The interconnection can have a numeric weight that can be tuned (e.g., based on a training dataset), allowing the neural network 510 to be adaptive to inputs and able to learn as more data is processed.

The neural network 510 can be pre-trained to process the features from the data in the input layer 502 using the different hidden layers 504 in order to provide the output through the output layer 506. In an example in which the neural network 510 is used to identify user and/or product(s), the neural network 510 can be trained using training data that includes example images and/or labeling and characteristic information of the plurality of documents. For instance, training images can be input into the neural network 510, which can be processed by the neural network 510 to generate outputs which can be used to tune one or more aspects of the neural network 510, such as weights, biases, etc.

In some cases, the neural network 510 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 510, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 510 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 510 can perform a backward pass by determining which inputs (weights) most contributed to the loss of the neural network 510 and can adjust the weights so that the loss decreases and is eventually minimized.

A derivative of the loss with respect to the weights can be computed to determine the weights that contributed most to the loss of the neural network 510. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 510 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 510 can represent any other neural or deep learning network, such as an autoencoder, a deep belief nets (DBNs), a recurrent neural network (RNN), etc.

Figure 6:
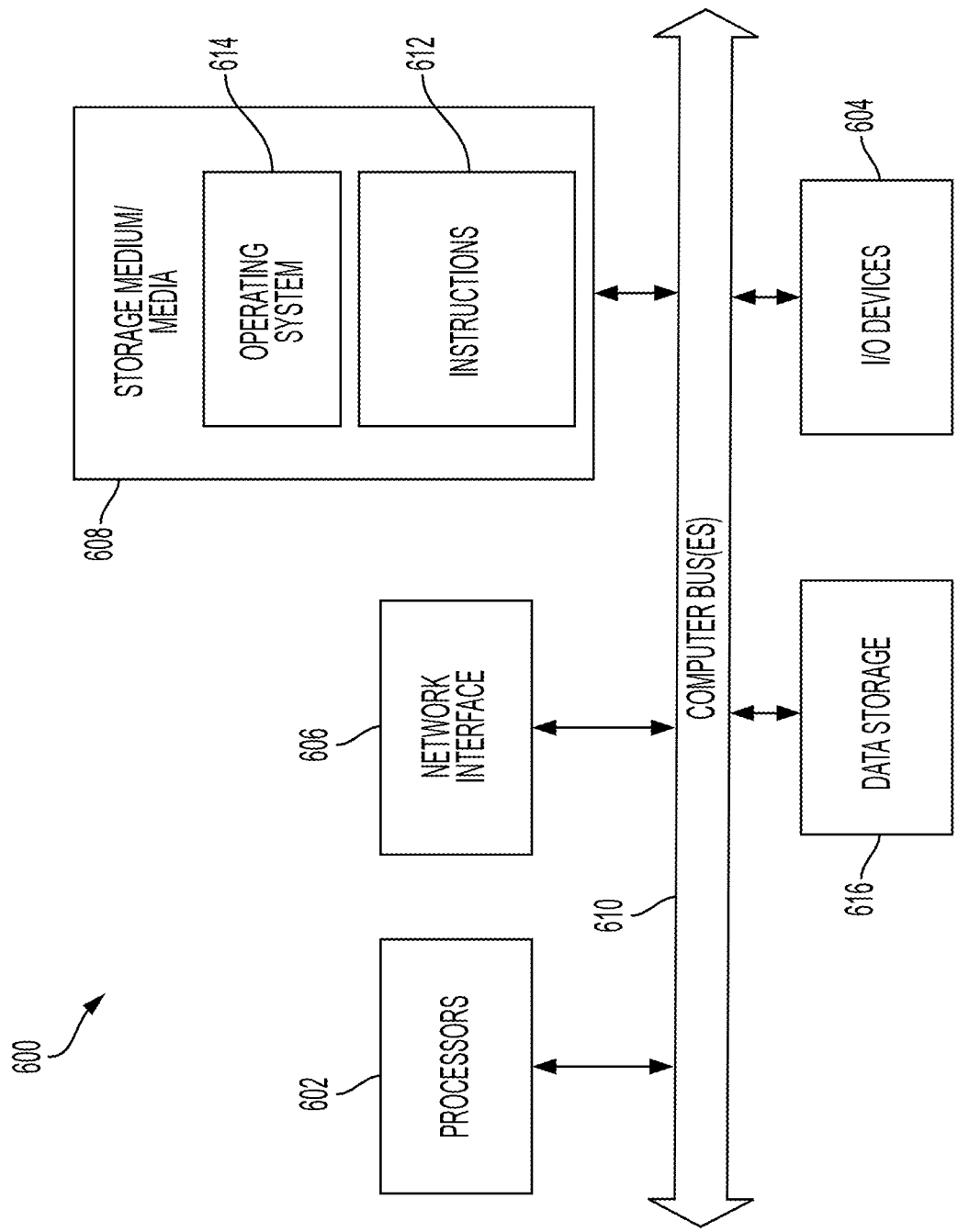
FIG. 6 illustrates an example of a computing system in accordance with certain embodiments.

FIG. 6 illustrates an example of a computing system 600 that may be used to implement embodiments as described herein, including the server 106 and/or the client device 104. The computing system 600 may include additional components not shown and that some of the process components described may be removed and/or modified. In another example, a computing system 600 may be deployed on external-cloud platforms such as cloud, internal corporate cloud computing clusters, organizational computing resources, and/or the like.

The computing system 600 includes processor(s) 602, such as a central processing unit, ASIC or another type of processing circuit, input/output devices 604, such as a display, mouse keyboard, etc., a network interface 606, such as a Local Area Network (LAN), a wireless 802.11x LAN, a 3G or 4G mobile WAN or a WiMax WAN, and a computer-readable medium 608. Each of these components may be operatively coupled to a bus 610.

The computer-readable medium 608 may be any suitable medium that participates in providing instructions to the processor(s) 602 for execution. For example, the computer-readable medium 608 may be non-transitory or non-volatile medium, such as a magnetic disk or solid-state non-volatile memory or volatile medium such as RAM. The instructions or modules stored on the computer-readable medium 608 may include machine-readable instructions 612 executed by the processor(s) 602 that cause the processor(s) 602 to perform the methods and functions performed by the server 106 and/or the client device 104.

The computing system 600 may be implemented as software stored on a non-transitory processor-readable medium and executed by the processor(s) 602. For example, the computer-readable medium 608 may store an operating system 614, such as MAC OS, MS WINDOWS, UNIX, or LINUX, and code, for the computing system 600. The operating system 614 may be multi-user, multiprocessing, multitasking, multithreading, real-time, and the like. For example, during runtime, the operating system 614 is running and the code for the computing system 600 is executed by the processor(s) 602.

The computing system 600 may include a data storage 616, which may include non-volatile data storage. The data storage 616 stores any data used or generated by the computing system 600.

The network interface 606 connects the computing system 600 to internal systems for example, via a LAN. Also, the network interface 606 may connect the computing system 600 to the Internet. For example, the computing system 600 may connect to web browsers and other external applications and systems via the network interface 606.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer will also include or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 602 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method for targeted data extraction, the method comprising:

causing a display, by one or more processors, of a first view of a graphical user interface (GUI) displaying a plurality of graphical elements for selection, each graphical element of the plurality graphical elements corresponds with a respective document from a plurality of documents;

detecting, by the one or more processors, a first input on the GUI selecting a first page view of a document from the plurality of documents, wherein the document is identified by selection of a respective graphical element associated with the document from among the plurality of documents;

detecting, by the one or more processors, a second input identifying an area of the first page view of the document;

determining, by the one or more processors, coordinates of the area of the first page view;

generating, by the one or more processors, a visual box based on the coordinates;

causing a display, by the one or more processors, of the visual box in the document on the GUI; and preserving, by the one or more processors, the visual box across an additional page, the additional page being one of remaining pages of the document or pages of remaining documents of the plurality of documents such that the display of the visual box persists in the additional page on the GUI.

2. The computer-implemented method of claim 1, further comprising:
   extracting, by the one or more processors, data corresponding to a portion of the document displayed on the GUI using the visual box for further processing.

3. The computer-implemented method of claim 2, wherein the data is extracted using an optical character recognition technique.

4. The computer-implemented method of claim 1, further comprising:
   upon navigating to the additional page, extracting, by the one or more processors, data corresponding to the visual box from the additional page for further processing.

5. The computer-implemented method of claim 1, wherein the second input is based on one of a click or a drag of a mouse on the GUI.

6. The computer-implemented method of claim 1, further comprising:
   determining, by the one or more processors, a number of possible areas corresponding to information of interest in the first page view; and
   visually presenting, by the one or more processors, the number of possible areas on the GUI,
   wherein the second input is a selection of one of the number of possible areas as the area of the first page view.

7. The computer-implemented method of claim 6, wherein the number of possible areas are determined using a trained neural network.

8. A system for targeted data extraction, the system comprising:
   at least one memory configured to store computer-readable instructions; and
   at least one processor communicatively coupled with the at least one memory, and configured to execute the computer-readable instructions to:
      cause a display of a first view of a graphical user interface (GUI) displaying a plurality of graphical elements for selection, each graphical element of the plurality graphical elements corresponds with a respective document from a plurality of documents;
      detect a first input on the GUI selecting a first page view of a document from the plurality of documents, wherein the document is identified by selection of a respective graphical element associated with the document from among the plurality of documents;
      detect a second input identifying an area of the first page view of the document;
      determine coordinates of the area of the first page view;
      generate a visual box based on the coordinates;
      cause a display of the visual box in the document on the GUI; and
      preserve the visual box across an additional page, the additional page being one of remaining pages of the document or pages of remaining documents of the plurality of documents such that the display of the visual box persists in the additional page on the GUI.

9. The system of claim 8, wherein the at least one processor is further configured to execute the computer-readable instructions to:
   extract data corresponding to a portion of the document displayed on the GUI using the visual box for further processing.

10. The system of claim 9, wherein the data is extracted using an optical character recognition technique.

11. The system of claim 8, wherein the at least one processor is further configured to execute the computer-readable instructions to:
   upon navigating to the additional page, extract data corresponding to the visual box from the additional page for further processing.

12. The system of claim 8, wherein the at least one processor is further configured to execute the computer-readable instructions to:
   determine a number of possible areas corresponding to information of interest in the first page view; and
   visually present the number of possible areas on the GUI,
   wherein the second input is a selection of one of the number of possible areas as the area of the first page view.

13. The system of claim 12, wherein the number of possible areas are determined using a trained neural network.

14. The system of claim 8, wherein the second input is based on one of a click or a drag of a mouse on the GUI.

15. One or more non-transitory computer-readable media comprising computer-readable instructions, which when executed by at least one processor of at least one computing device, cause the at least one computing device to:
   cause a display of a first view of a graphical user interface (GUI) displaying a plurality of graphical elements for selection, each graphical element of the plurality graphical elements corresponds with a respective document from a plurality of documents;
   detect a first input on the GUI selecting a first page view of a document from the plurality of documents, wherein the document is identified by selection of a respective graphical element associated with the document from among the plurality of documents;
   detect a second input identifying an area of the first page view of the document;
   determine coordinates of the area of the first page view;
   generate a visual box based on the coordinates;
   cause a display of the visual box in the document on the GUI; and
   preserve the visual box across an additional page, the additional page being one of remaining pages of the document or pages of remaining documents of the plurality of documents such that the display of the visual box persists in the additional page on the GUI.

16. The one or more non-transitory computer-readable media of claim 15, wherein the at least one processor is further configured to execute the computer-readable instructions to:
   extract data corresponding to a portion of the document displayed on the GUI using the visual box for further processing.

17. The one or more non-transitory computer-readable media of claim 16, wherein the data is extracted using an optical character recognition technique.

18. The one or more non-transitory computer-readable media of claim 15, wherein the at least one processor is further configured to execute the computer-readable instructions to:
   upon navigating to the additional page, extract data corresponding to the visual box from the additional page for further processing.

19. The one or more non-transitory computer-readable media of claim 15, wherein the at least one processor is further configured to execute the computer-readable instructions to:
  determine a number of possible areas corresponding to information of interest in the first page view; and
  visually present the number of possible areas on the GUI,
  wherein the second input is a selection of one of the number of possible areas as the area of the first page view, and
  wherein the second input is based on one of a click or a drag of a mouse on the GUI.

20. The one or more non-transitory computer-readable media of claim 19, wherein the number of possible areas are determined using a trained neural network.

* * * * *